(12) United States Patent
Chen et al.

(10) Patent No.: US 8,253,776 B2
(45) Date of Patent: Aug. 28, 2012

(54) IMAGE RECTIFICATION METHOD AND RELATED DEVICE FOR A VIDEO DEVICE

(75) Inventors: Liang-Gee Chen, Taipei (TW); Chia-Ho Pan, Taipei (TW)

(73) Assignee: ASUSTeK Computer Inc., Taipei (TW)

( * ) Notice: Subject to any disclaimer, the term of this patent is extended or adjusted under 35 U.S.C. 154(b) by 912 days.

(21) Appl. No.: 12/345,633

(22) Filed: Dec. 29, 2008

(65) Prior Publication Data

US 2009/0179984 A1    Jul. 16, 2009

Related U.S. Application Data

(60) Provisional application No. 61/020,151, filed on Jan. 10, 2008.

(51) Int. Cl.
*H04N 7/14* (2006.01)

(52) U.S. Cl. ............... 348/14.16; 348/14.08; 348/14.12

(58) Field of Classification Search .... 348/14.01–14.16, 348/222.1

See application file for complete search history.

(56) References Cited

U.S. PATENT DOCUMENTS

| | | | |
|---|---|---|---|
| 5,117,285 A | 5/1992 | Nelson et al. | |
| 5,219,654 A | 6/1993 | Singh et al. | |
| 5,257,306 A | 10/1993 | Watanabe | |
| 5,317,405 A * | 5/1994 | Kuriki et al. | 348/14.16 |
| 5,400,069 A | 3/1995 | Braun et al. | |
| 5,500,671 A * | 3/1996 | Andersson et al. | 348/14.1 |
| 5,666,155 A | 9/1997 | Mersereau | |
| 5,675,376 A | 10/1997 | Andersson et al. | |
| 5,777,665 A | 7/1998 | McNelley et al. | |
| 5,856,842 A | 1/1999 | Tedesco | |
| 5,890,787 A | 4/1999 | McNelley et al. | |
| 5,953,052 A | 9/1999 | McNelley et al. | |
| 6,042,235 A | 3/2000 | Machtig et al. | |
| 6,104,424 A | 8/2000 | McNelley | |
| 6,243,130 B1 | 6/2001 | McNelley et al. | |
| 6,393,136 B1 | 5/2002 | Amir et al. | |
| 6,507,357 B2 | 1/2003 | Hillis et al. | |
| 6,710,797 B1 | 3/2004 | McNelley et al. | |
| 6,724,417 B1 | 4/2004 | Hillis et al. | |
| 2007/0206090 A1 * | 9/2007 | Barraud et al. | 348/14.02 |

FOREIGN PATENT DOCUMENTS

CN    1423228 A    6/2003

OTHER PUBLICATIONS

TSAI, "Symmetric Trinocular Dense Disparity Estimation for Car Surrounding Camera Array," Visual Communications and Image Processing 2007, Jan. 28, 2007, 65081F-1~8, vol. 6508, SPIE.

* cited by examiner

*Primary Examiner* — Melur Ramakrishnaiah

(74) *Attorney, Agent, or Firm* — CKC & Partners Co., Ltd.

(57) ABSTRACT

An image rectification method for a video device includes receiving an image that is a facial image of a transmitter from the transmitter, obtaining a first angular deviation with respect to line of sight of the transmitter according to the image, obtaining a second horizontal angular deviation and a second vertical angular deviation with respect to line of sight of a receiver using the video device, and performing an image synthesis procedure on the image according to the first angular deviation, the second horizontal angular deviation and the second vertical angular deviation, for generating an eye-to-eye image sent to the receiver.

14 Claims, 5 Drawing Sheets

Video Device A

Video Device B

IMAGE RECTIFICATION METHOD AND RELATED DEVICE FOR A VIDEO DEVICE

CROSS REFERENCE TO RELATED APPLICATIONS

This application claims the benefit of U.S. Provisional Application No. 61/020,151, filed on Jan. 10, 2008 and entitled "Real-Time Free Viewpoint Rendering System for Face-to-face Video Conference", the contents of which are incorporated herein by reference.

BACKGROUND OF THE INVENTION

1. Field of the Invention

The present invention relates to an image rectification method and related device for a video device, and more particularly, to an image rectification method and related device for rectifying a received image according to a position of the received image shown in the video device.

2. Description of the Prior Art

Real-time text messages and VoIP phone are popular internet applications in modern life. With the advancement of internet technology, people are dissatisfied with pure text or voice communication, and therefore videoconferencing applications arise. People can make videoconference calls with real-time images, which brings many more interactive effects, to communicate with others. Communications are much more precise and interesting via videoconferencing applications.

In a common video device, such as a desktop computer or a laptop computer, a camera is usually set above a screen of the computer. A computer user, hereinafter call transmitter, views a facial image of another computer user, hereinafter called a receiver, shown in the screen, and the transmitter uses the camera to capture real-time images of the transmitter and transmits images to the receiver. Please refer to FIG. 1, which illustrates a relationship between video devices and the video device users. As shown in FIG. 1, a transmitter using a video device A makes a videoconference call to a receiver using a video device B. Note that there is a distance between a camera of the video device A and the facial image of the receiver shown in a screen of the video device A. Further, line of sight of the transmitter is toward the image of the receiver, not toward the camera, such that an angular deviation θ is formed between the line of sight of the transmitter and the direction from the transmitter's eyes to the camera.

In the viewpoint of the receiver, the receiver may feel that the transmitter is not looking at the receiver but is looking down with the angular deviation θ. Hence, the experience of the receiver using the videoconference application is affected. The receiver can receive an eye-to-eye image only when the transmitter is looking at the camera, whereas the transmitter may not know whether the receiver is looking at the transmitter because the transmitter is looking at the camera, not looking at the image of the receiver. In other words, in the prior art, both the transmitter and the receiver feel that the opposite is not looking at itself.

In order to overcome the above problem, another conventional video device assumes that a distance between the transmitter and the camera is fixed, and performs some image synthesis procedures on the transmitted image to rectify line of sight of the transmitter before transmitting the image. Please refer to FIG. 1 again. The video device A can obtain the angular deviation θ formed by a distance D1 from transmitter's eyes to the camera and a distance D2 from the transmitter's eye to a facial image of the receiver. The video device A performs an image rectification procedure on the captured face image of the transmitter, and transmits the rectified image of the transmitter to the video device B. Therefore, the receiver feels that the transmitter is looking at the receiver and therefore communications with natural eye contact are achieved.

The two above conventional video devices do not consider how the receiver uses the video device. Please refer to FIG. 1 again. The video device B is running other tasks such as document editing or programming in other windows at the same time as performing the videoconference call, and the window of the videoconference call is not in the middle of the screen. In this situation, even if the video device A already performed the image rectification process on the face image of the transmitter, the receiver still feels that line of sight of the transmitter is in direction V1, and not in direction V2. In other words, the receiver still feels that the transmitter is not looking at the receiver.

From the above, the conventional video device only takes the position of the transmitter's eyes and the position of the camera into consideration when rectifying the image of the transmitter and does not consider how the receiver uses the video device. When the videoconference window is not in the middle of the screen, the receiver can not experience natural eye interaction.

SUMMARY OF THE INVENTION

It is therefore a primary objective of the claimed invention to provide an image rectification method and related device for a video device.

The present invention discloses an image rectification method for a video device. The image rectification method comprises receiving an image that is a facial image of a transmitter from the transmitter, obtaining a first angular deviation with respect to line of sight of the transmitter according to the image, obtaining a second horizontal angular deviation and a second vertical angular deviation with respect to line of sight of a receiver using the video device, and performing an image synthesis procedure on the image according to the first angular deviation, the second horizontal angular deviation and the second vertical angular deviation, for generating an eye-to-eye image sent to the receiver.

The present invention further discloses an image rectification device for a video device. The image rectification device comprises a receiving unit, an angle measurement unit and an image synthesis unit. The receiving unit is utilized for receiving an image that is a facial image of a transmitter from the transmitter. The angle measurement unit is coupled to the receiving unit, and is utilized for obtaining a first angular deviation with respect to line of sight of the transmitter according to the image and obtaining a second horizontal angular deviation and a second vertical angular deviation with respect to line of sight of a receiver using the video device. The image synthesis unit is coupled to the receiving unit and the angle measurement unit, and is utilized for performing an image synthesis procedure on the image according to the first angular deviation, the second horizontal angular deviation and the second vertical angular deviation, for generating an eye-to-eye image sent to the receiver.

These and other objectives of the present invention will no doubt become obvious to those of ordinary skill in the art after reading the following detailed description of the preferred embodiment that is illustrated in the various figures and drawings.

DETAILED DESCRIPTION

Figure 2:
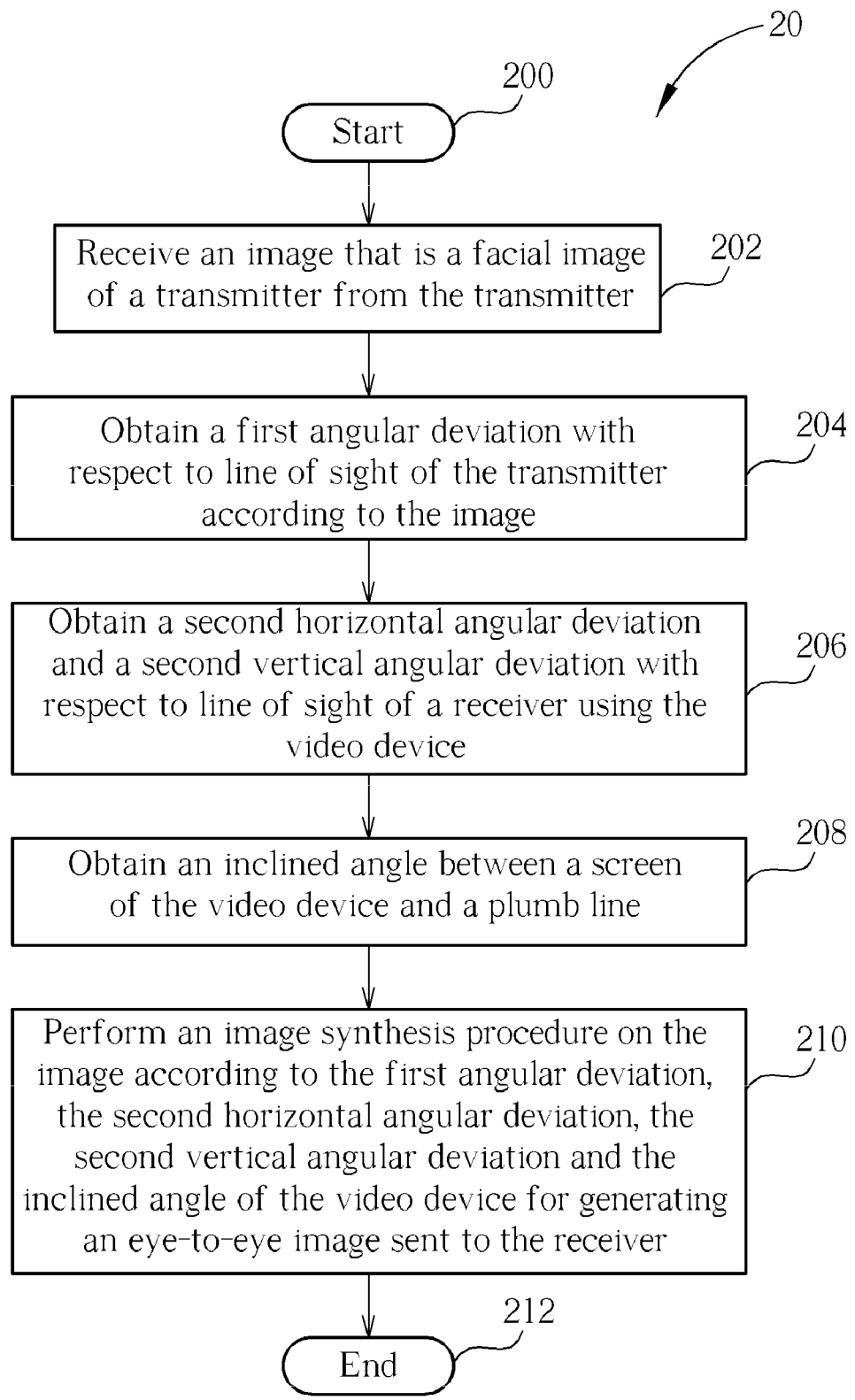
FIG. 2 is a flowchart of a process according to an embodiment of the present invention.

Please refer to FIG. 2, which is a flowchart of a process 20 according to an embodiment of the present invention. The process 20 is utilized in a video device, such as a laptop computer supporting videoconferencing functions, for rectifying a received image such that a user of the video device can see an eye-to-eye image during a videoconference call. The process 20 comprises the following steps:

Step 200: Start.

Step 202: Receive an image that is a facial image of a transmitter from the transmitter.

Step 204: Obtain a first angular deviation with respect to line of sight of the transmitter according to the image.

Step 206: Obtain a second horizontal angular deviation and a second vertical angular deviation with respect to line of sight of a receiver using the video device.

Step 208: Obtain an inclined angle between a screen of the video device and a plumb line.

Step 210: Perform an image synthesis procedure on the image according to the first angular deviation, the second horizontal angular deviation, the second vertical angular deviation and the inclined angle of the video device for generating an eye-to-eye image sent to the receiver.

Step 212: End.

In the process 20, the receiver is the user of the video device where the process 20 is used, who is performing a videoconference call with the transmitter. Actually, number of receivers and transmitters are not limited in a videoconference call, and the process 20 can be applied in every video device participating in the videoconference call.

Figure 1:
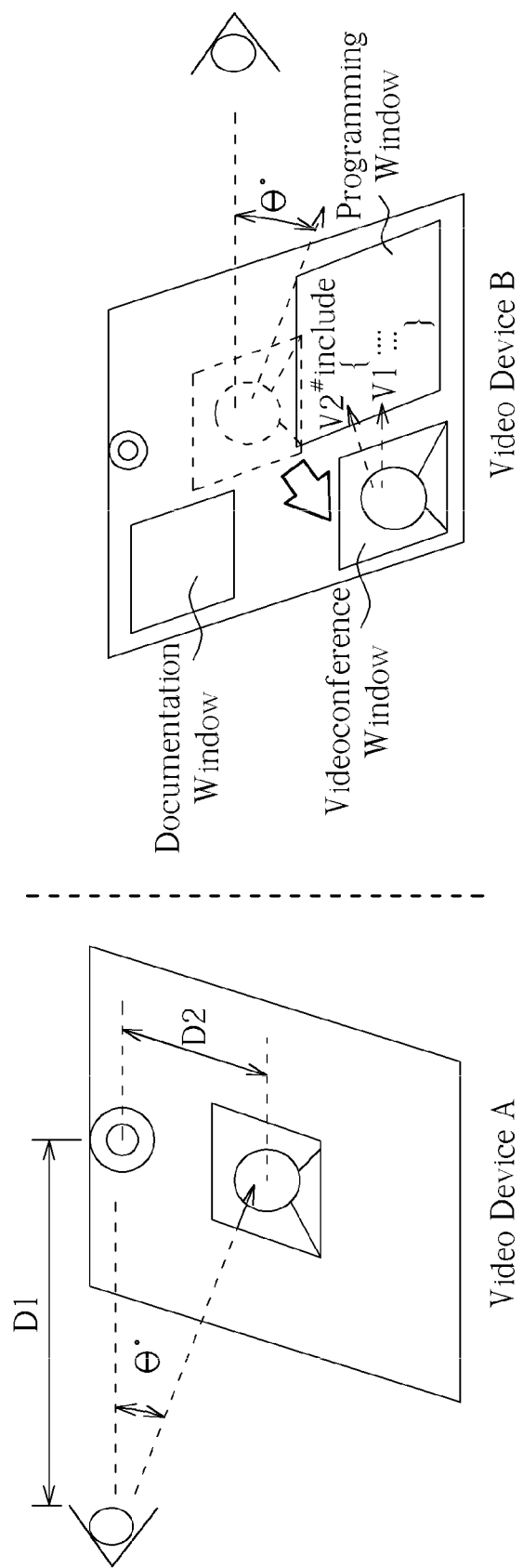
FIG. 1 is a schematic diagram of a relationship between video devices and corresponding users.

Please both refer to FIG. 1 and FIG. 2 to see a relationship between the video devices and the corresponding users. In FIG. 1, the receiver uses the video device B and the transmitter uses the video device A. The embodiment of the present invention supposes that the transmitter does not perform any image rectification procedure on the transmitted image. After receiving the image of the transmitter, in Step 204, the video device B obtains the first angular deviation θ, as shown in FIG. 1, according to the image. The first angular deviation θ is formed between line of sight of the transmitter toward the image of the receiver shown in a conference window on a screen of the video device A and the direction from the transmitter's eyes to a camera of the video device A. The video device B measures the depth information of the image of the transmitter according to a depth-based scheme, such as a Motion Estimation algorithm, and thereby obtains the first angular deviation.

Figure 3:
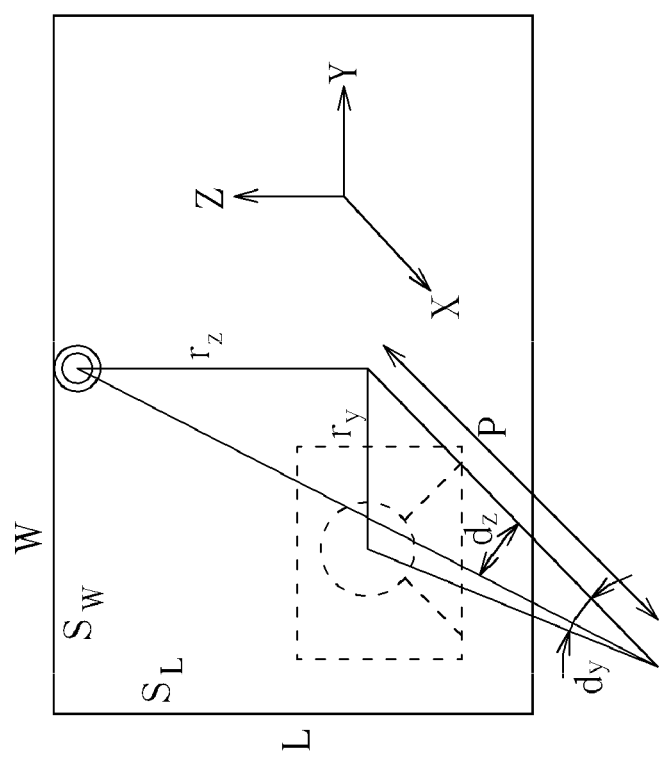
FIG. 3 is a schematic diagram of a relationship between a received facial image and a camera of a video device and associated angular deviation.

Please note that, as shown in FIG. 1, when the receiver performs several tasks on the video device B, such as document editing, programming and videoconferencing, at the same time, the videoconference window may not be in the middle of the screen of the video device B. Therefore, the receiver feels that the transmitter is not looking at the receiver, even if the video device B already rectified the image of the transmitter according to the first angular deviation. Please refer to FIG. 3, which is a schematic diagram of a relationship between a received facial image and a camera of a video device and associated angular deviations. In Step 206, the video device B further obtains the second horizontal angular deviation $d_y$ and the second vertical angular deviation $d_z$, as shown in FIG. 3, according to a position of the camera of the video device B, a position of the receiver's eyes and a position of the facial image of the transmitter. $S_W$ and $S_L$ represent resolution of the screen of the video device B; P is a vertical distance between the receiver's eyes and the screen, W and L are width and length of the screen, $r_y$ and $r_z$ are a horizontal component and a vertical component represented as a distance in pixels between the camera of the video device B and the facial image of the transmitter. The second horizontal angular deviation $d_y$ and the second vertical angular deviation $d_z$ are derived by the following equations:

$$d_y = \tan^{-1}(r_y/s_W * W/P) \quad (1)$$

$$d_z = \tan^{-1}(r_z/s_L * L/P) \quad (2)$$

In the embodiment of the present invention, the position of the image of the transmitter is determined by a cursor controlled by the receiver. When the receiver moves the cursor to the position of the transmitter's eyes, the video device B obtains the most precise $d_y$ and $d_z$ and the image of the transmitter is therefore rectified precisely. Please note that, measurement of the second horizontal angular deviation $d_y$ and the second vertical angular deviation $d_z$ illustrated previously is based on an assumption that the screen of the video device B is parallel with a plumb line.

Figure 4:
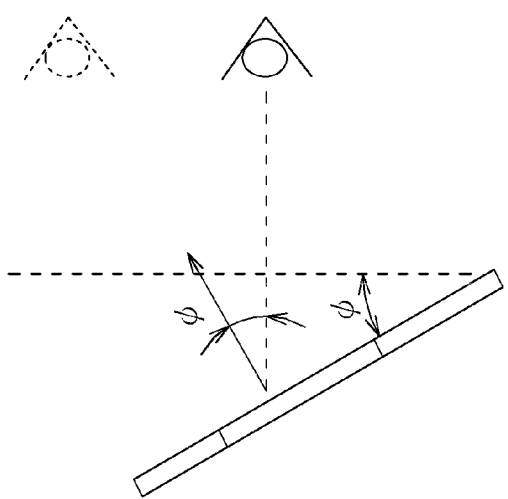
FIG. 4 is a schematic diagram of an inclined angle of a screen of a video device.

Please refer to FIG. 4, which is a schematic diagram of an inclined angle of a screen of a video device. As shown in FIG. 4, there is an inclined angle ψ between the screen of the video device and a plumb line shown by a dotted line. If the inclined angle ψ is formed between the screen of the video device B and the plumb line, the receiver may feel that the transmitter is not looking at the receiver but is looking upward, even if the video device B already rectified the image of the transmitter according to the first angular deviation, the second horizontal angular deviation and the second vertical angular deviation. In Step 208, the video device B further obtains the inclined angle ψ. Note that, in the process 20, Step 204 to Step 208 are used for obtaining angles and actually no specific order is required for obtaining these angles. Next, in Step 210, the video device B performs the image synthesis procedure on the image of the transmitter according to the first angular deviation, the second horizontal angular deviation, the second vertical angular deviation and the inclined angle, for generating a preferred image of the transmitter that is also an eye-to-eye image sent to the receiver, so that the receiver feels that the transmitter is looking at the receiver during the videoconference call. Precisely, the video device B performs the image synthesis procedure by an appropriate algorithm, such as a Depth Image Based Rendering (DIBR) method, to generate the eye-to-eye image.

Please note that, the process 20 is one embodiment of the present invention, and those skilled in the art can make alterations and modifications accordingly. For example, the first angular deviation can be measured according to algorithms other than the Motion Estimation algorithm; or, the video device B can perform the image synthesis procedure according to algorithms other than the DIBR method. In another embodiment of the present invention, it may be assumed that the screen of the video device B is parallel with the plumb line, so that Step 208 of obtaining the inclined angle is ignored.

Figure 5:
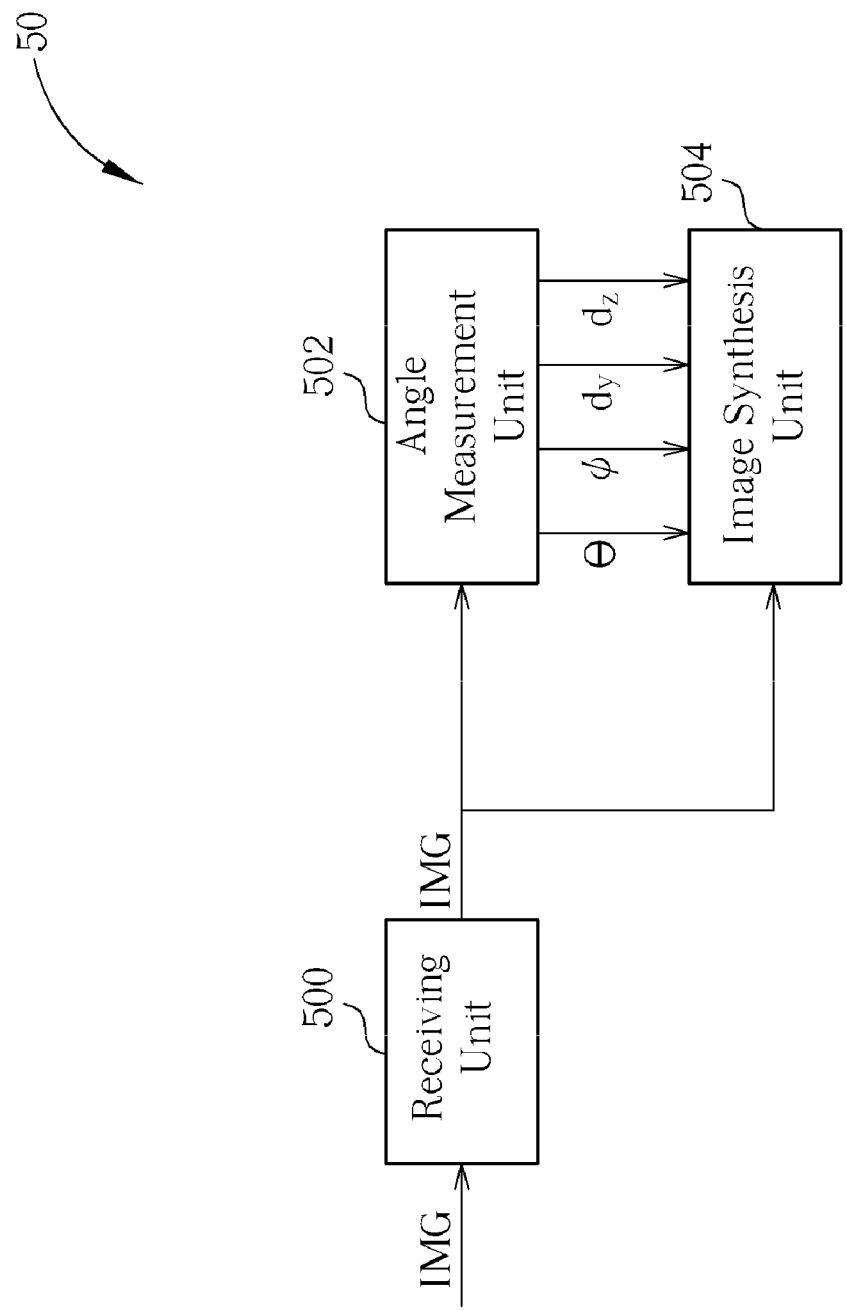
FIG. 5 is a schematic diagram of an image rectification device according to an embodiment of the present invention.

Please refer to FIG. 5 for a hardware implementation of the process 20. FIG. 5 is a schematic diagram of an image rectification device 50 according to an embodiment of the present invention. The image rectification device 50 is utilized in the video device B and comprises a receiving unit 500, an angle measurement unit 502 and an image synthesis unit 504. The receiving unit 500 is utilized for receiving the image of the transmitter IMG. The angle measurement unit 502 is coupled to the receiving unit 500 and is utilized for obtaining the first angular deviation θ, the second horizontal angular deviation $d_y$, the second vertical angular deviation $d_z$ and the inclined angle ψ. The image synthesis unit 504 is coupled to the receiving unit 500 and the angle measurement unit 502, and is utilized for performing the image synthesis procedure on the image of the transmitter IMG according to the first angular deviation θ, the second horizontal angular deviation $d_y$, the second vertical angular deviation $d_z$ and the inclined angle ψ, for generating the eye-to eye image sent to the receiver. Detail of the above angles and associated algorithms for obtaining the first angular deviation and performing the image synthesis procedure are described previously and not repeated here. In another embodiment of the present invention, the inclined angle ψ can be ignored so that the angle measurement unit 502 is not required to measure the inclined angle ψ.

In conclusion, the embodiment of the present invention performs the image synthesis procedure on the image of the transmitter according to the first angular deviation, the second horizontal angular deviation, the second vertical angular deviation and the inclined angle, for generating the eye-to eye image sent to the receiver. Therefore, the embodiment of the present invention provides the image of the transmitter with natural eye contact, so that the receiver feels that the transmitter is looking at the receiver during the videoconference call and the user experience is improved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An image rectification method for a video device, the image rectification method comprising:
    receiving an image that is a facial image of a transmitter from the transmitter;
    obtaining a first angular deviation with respect to line of sight of the transmitter according to the image;
    obtaining a second horizontal angular deviation and a second vertical angular deviation with respect to line of sight of a receiver using the video device; and
    performing an image synthesis procedure on the image according to the first angular deviation, the second horizontal angular deviation and the second vertical angular deviation, for generating an eye-to-eye image sent to the receiver.

2. The image rectification method of claim 1 further comprising obtaining an inclined angle between a screen of the video device and a plumb line.

3. The image rectification method of claim 2, wherein the step of performing the image synthesis procedure on the image comprises performing the image synthesis procedure on the image of the transmitter according to the first angular deviation, the second horizontal angular deviation, the second vertical angular deviation and the inclined angle, for generating the eye-to-eye image sent to the receiver.

4. The image rectification method of claim 1, wherein the step of obtaining the first angular deviation comprises measuring depth information of the image according to a Motion Estimation algorithm for obtaining the first angular deviation.

5. The image rectification method of claim 1, wherein the step of obtaining the second horizontal angular deviation and the second vertical angular deviation comprises obtaining the second horizontal angular deviation and the second vertical angular deviation according to a position of the receiver, a position of a camera of the video device and a position of the image of the transmitter shown in the video device.

6. The image rectification method of claim 5, wherein the position of the image of the transmitter is determined by a cursor controlled by the receiver.

7. The image rectification method of claim 1, wherein the step of performing the image synthesis procedure on the image comprises performing the image synthesis procedure on the image of the transmitter according to a Depth-Image-Based Rendering (DIBR) method.

8. An image rectification device for a video device, the image rectification device comprising:
    a receiving unit for receiving an image that is a facial image of a transmitter from the transmitter;
    an angle measurement unit coupled to the receiving unit for obtaining a first angular deviation with respect to line of sight of the transmitter according to the image, and obtaining a second horizontal angular deviation and a second vertical angular deviation with respect to line of sight of a receiver using the video device; and
    an image synthesis unit coupled to the receiving unit and the angle measurement unit for performing an image synthesis procedure on the image according to the first angular deviation, the second horizontal angular deviation and the second vertical angular deviation, for generating an eye-to-eye image to sent the receiver.

9. The image rectification device of claim 8, wherein the angle measurement unit is further utilized for obtaining an inclined angle between a screen of the video device and a plumb line.

10. The image rectification device of claim 9, wherein the image synthesis unit performs the image synthesis procedure on the image according to the first angular deviation, the second horizontal angular deviation, the second vertical angular deviation and the inclined angle.

11. The image rectification device of claim 8, wherein the angle measurement unit measures the depth information of the image according to a Motion Estimation algorithm for obtaining the first angular deviation.

12. The image rectification device of claim 8, wherein the angle measurement unit obtains the second horizontal angular deviation and the second vertical angular deviation according to a position of the receiver, a position of a camera of the video device and a position of the image of the transmitter shown in the video device.

13. The image rectification device of claim 12, wherein the position of the image of the transmitter is determined by a cursor controlled by the receiver.

14. The image rectification device of claim 8, wherein the image synthesis unit performs the image synthesis procedure on the image according to a Depth-Image-Based Rendering (DIBR) method.

* * * * *